March 26, 1935.  R. C. JACOBS  1,995,772
GLARE SHIELD
Filed April 7, 1933   2 Sheets-Sheet 1

INVENTOR
Rex C. Jacobs,
BY
ATTORNEYS

March 26, 1935. R. C. JACOBS 1,995,772
GLARE SHIELD
Filed April 7, 1933 2 Sheets-Sheet 2
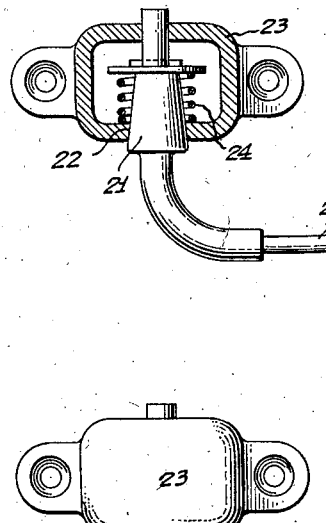
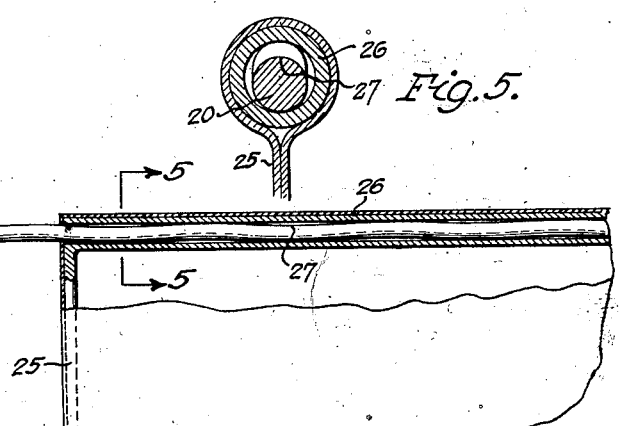
Fig. 5.
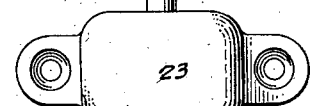
Fig. 4.
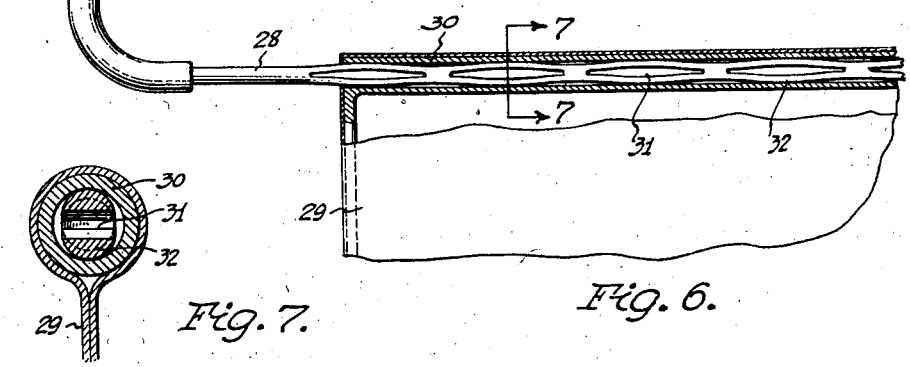
Fig. 7.
Fig. 6.
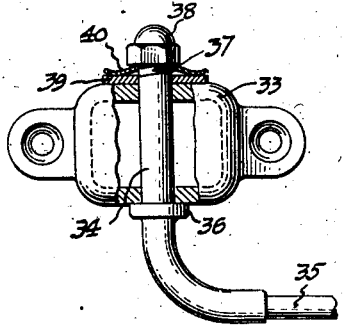
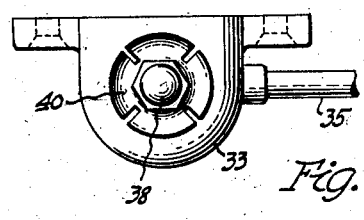
Fig. 9.
Fig. 8.
INVENTOR
Rex C. Jacobs,
BY
ATTORNEYS Patented Mar. 26, 1935

1,995,772

UNITED STATES PATENT OFFICE 1,995,772

GLARE SHIELD

Rex C. Jacobs, Detroit, Mich.

Application April 7, 1933, Serial No. 664,919

2 Claims. (Cl. 296—97)

The present invention relates to a novel glare shield of the type particularly adapted for use in automobiles and like vehicles.

The primary object of the invention is to provide a glare shield member and means for attaching the same within an automobile so that it may be easily moved to various positions to protect the eyes of the operator or of passengers within the vehicle by intercepting rays of light either from the sun as it nears the horizon or from headlights on approaching and passing vehicles.

The glare eliminator comprises a supporting bracket adapted to be secured above the windshield or above a window in an automobile to pivotally hold a supporting member upon which is received the shield proper, frictional means being provided to resist movement of the shield relative to the supporting member and of the supporting member relative to the bracket and thus provide an eliminator which may be easily adjusted for use and which may be moved to a position to occupy a minimum amount of space when not in use.

With the above and other ends in view the invention consist in matters hereinafter set forth and more particularly pointed out in the appended claims, reference being had to the accompanying drawings in which Figure 1 is a fragmentary perspective of an automobile illustrating the present glare shield mounted therein;

Fig. 4 is an elevation partly in cross section and illustrating means for preventing movement of the shield proper relative to its supporting member;

Fig. 5 is a cross section taken on the line 5—5 of Fig. 4;

Fig. 6 is a section illustrating another means for preventing movement of the shield relative to its supporting member;

Fig. 7 is a cross section taken on line 7—7 of Fig. 6;

Fig. 8 is a section through a modified supporting bracket, and

Fig. 9 is a plan view thereof.

Like characters of reference are employed throughout to designate corresponding parts.

Figure 1:
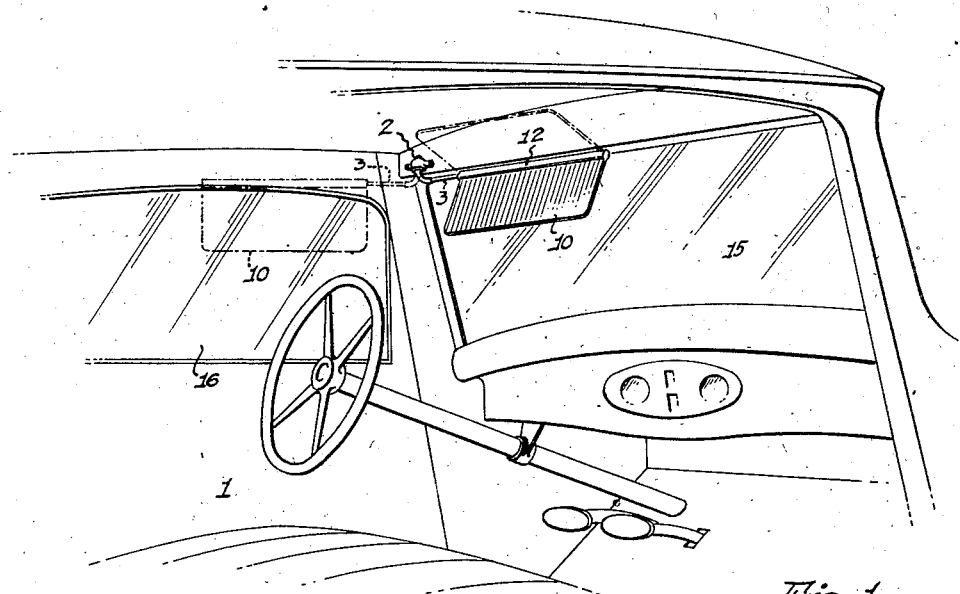
Figure 2:
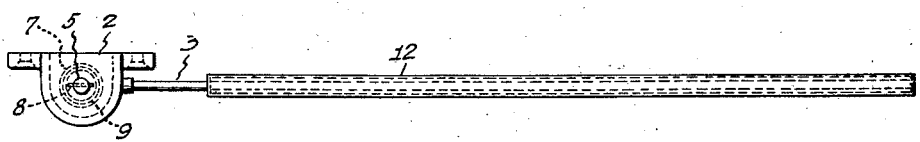
Fig. 2 is a top plan of the glare shield.

The numeral 1 indicates in general an automobile having a bracket 2 secured above the windshield thereof. A rod 3 is provided with a conical portion 4 that is received in a similarly shaped opening in the bracket 2 and with a pilot portion 5 received in a bore 6. A washer 7 is secured to the pilot portion 5 by a pin 8 and a compressed coiled spring 9 is interposed between the washer and a portion of the supporting bracket 2 to frictionally maintain the conical portion 4 in its receiving bore. A shield 10 is formed of a U-shaped frame 11 having its ends joined with a tubular member 12, the tubular member 12 being received on the rod 3. Suitable fabric 14 may be secured on the frame constructed of the U-shaped member 11 and the tubular member 12 in order to render the same opaque.

The numeral 15 indicates the windshield of an automobile and the numeral 16 indicates a window. In the illustration the bracket 2 is mounted above the windshield and the shield supporting member may be moved pivotally in the bracket 2 to locate the shield above the windshield or above the window it being obvious from the above description that the spring 9 pulling the conical member 4 into the conical bore in the supporting bracket exerts sufficient frictional resistance to hold the member in any adjusted position.

Figure 3:
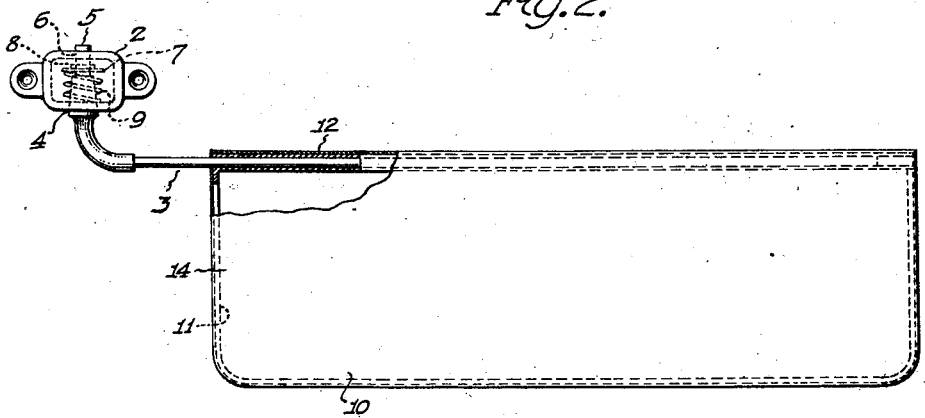
Fig. 3 is a side elevation partly in cross section.

The shield frame 11 and 12 may also move pivotally relative to the rod 3 and as illustrated in Fig. 3 the tubular member 12 is fitted on the rod tight enough to frictionally resist movement sufficiently that it will remain in any adjusted position.

Referring to Figs. 4 and 5 a rod 20 is provided with a conical portion 21 received in a conical bore 22 in a supporting bracket 23, a spring 24 being provided to urge the conical portion into a conical bore to frictionally resist movement of the member 20 relative to the bracket. The glare shield frame 25 includes a tubular member 26 in which the rod 20 is received, the tubular member being formed of comparatively thin stock so as to be flexible to a certain degree. In this instance the rod 20 is provided with a series of bends 27 so that the same contacts with a tubular member at diametrically opposite sides as illustrated in Fig. 5, it being noted that the cross sectional area of the rod is less than the cross sectional area of the opening within the tube.

In Figs. 6 and 7 there is illustrated a further modification of a supporting rod 28 that receives a shield 29 having a tubular member 30. In this instance the supporting rod 28 is provided with a series of saw cuts or slots 31 and the metal adjacent the saw cuts is expanded in order to engage the inner surface of the tubular member 30 as at 32, in a resilient fashion to frictionally resist movement of the shield pivotally relative to the supporting member.

In Figs. 8 and 9 there is shown a supporting bracket 33 in which is received a straight portion 34 of a glare shield supporting rod 35. At the lower end of the straight portion 34 there is formed a collar 36 which engages the lower surface of the supporting bracket. The upper end of the straight portion 34 is screwthreaded as at 37 to receive a nut 38, a washer 39 being received on the straight portion 34 externally of the bracket. In order to frictionally resist rotary movement of the straight portion 34 relative to the supporting bracket there is provided a spring washer 40 that is interposed between the nut and the washer 39 to draw the collar 36 against the bracket.

Although specific embodiments of the present invention have been illustrated and described it is to be understood that various changes may be made in the details of construction without departing from the spirit of the invention as set forth in the appended claims and such changes are contemplated.

What I claim is:—

1. A glare shield comprising a continuous integral marginal frame adapted to receive a fabric covering, said frame having at least one side constituted of a tubular member, a supporting bracket, a supporting member mounted in said supporting bracket for horizontal swinging movement and extending into said tubular portion, said supporting member and the interior of said tubular portion constituting the hinge for said shield, said supporting member being of undulating form for frictionally resisting rotation of said tubular member thereon, and spring means for maintaining said supporting member in said bracket, said spring means setting up a substantial pressure contact between said bracket and said supporting member to provide friction therebetween whereby said supporting member may be maintained in a set position.

2. In combination, a glare shield comprising a frame having a tube forming one side thereof and an opaque covering completely enveloping said frame except for the openings in said tube, an undulating rod having a diameter at any cross section slightly less than the diameter of said tube extending substantially through said tube and having one end projecting outwardly thereof for attachment to a hinge member, said rod being unsupported at its other end, said rod by its undulating formation setting up a frictional locking engagement against endwise displacement with respect to said tube, said shield being rotatable on said rod, said rod by its undulating formation setting up friction against such rotation sufficient to maintain said shield in a set position, a bracket, a hinge member projecting into said bracket and journalled in opposite walls thereof, said hinge member having an enlarged portion for contact with one of said walls, and spring means supporting said hinge member in said bracket, said spring means maintaining said enlarged portion in pressure contact with said bracket, said hinge member being bent at an angle for attachment to said supporting arm.

REX C. JACOBS.